(12) United States Patent
Bae et al.

(10) Patent No.: US 7,987,216 B2
(45) Date of Patent: Jul. 26, 2011

(54) SVC FILE DATA SHARING METHOD AND SVC FILE THEREOF

(75) Inventors: Seong-Jun Bae, Daejeon (KR); Yong-Ju Cho, Daejeon (KR); Jae-Gon Kim, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 151 days.

(21) Appl. No.: 12/160,257

(22) PCT Filed: Jan. 9, 2007

(86) PCT No.: PCT/KR2007/000166
§ 371 (c)(1),
(2), (4) Date: Feb. 18, 2009

(87) PCT Pub. No.: WO2007/081149
PCT Pub. Date: Jul. 19, 2007

(65) Prior Publication Data
US 2009/0222486 A1    Sep. 3, 2009

Related U.S. Application Data

(60) Provisional application No. 60/757,279, filed on Jan. 9, 2006.

(30) Foreign Application Priority Data

Dec. 8, 2006    (KR) .................. 10-2006-0125051
Jan. 8, 2007    (KR) .................. 10-2007-0002187

(51) Int. Cl.
*G06F 12/00*    (2006.01)
*H04N 7/12*    (2006.01)
*H04N 5/917*    (2006.01)

(52) U.S. Cl. ............ 707/825; 375/240.21; 375/240.26; 386/328; 386/331; 386/354; 707/914

(58) Field of Classification Search .............. 725/133; 375/240, 240.21, 240.26; 707/999.104, 705, 707/803, 999.107, 825, 914; 386/109, 46, 386/328, 331, 354; 709/247
See application file for complete search history.

(56) References Cited

U.S. PATENT DOCUMENTS
5,132,992 A * 7/1992 Yurt et al. ............ 375/240
(Continued)

OTHER PUBLICATIONS

International Search Report mailed Mar. 30, 2007; PCT/KR2007/000166. David Singer, et al; "On the SVC File Format VM", International Organisation For Standardisation Organisation Internationale De Normalisation ISO/IEC/JTC1/SC29/WG11 Coding of Moving Pictures and Audio; MPEG2005/M12490; Oct. 2005, Nice, 7 pages.

*Primary Examiner* — Vincent Boccio
(74) *Attorney, Agent, or Firm* — Ladas & Parry LLP

(57) ABSTRACT

A method of sharing data of a scalable video coding (SVC) file and the SVC file are provided. The SVC file includes: a scalable base track including at least one scalable layer entry each storing metadata of the at least one scalable layer; and at least one sub track generated based on the scalable base track, which includes identification information of the scalable layer that is a basis of generation of a sub track among the scalable layers and identification information of the scalable base track instead of the scalable layer entry. Accordingly, when an SVC coded content is stored as a file, it is possible to reduce a storage capacity by avoiding duplication of common data and to provide convenience when the stored content is reprocessed by allowing a relation of tracks correlated to one another to be represented.

11 Claims, 6 Drawing Sheets

U.S. PATENT DOCUMENTS

| | | |
|---|---|---|
| 5,621,660 A * | 4/1997 | Chaddha et al. ............... 709/247 |
| 6,430,354 B1 * | 8/2002 | Watanabe ..................... 386/124 |
| 6,925,249 B1 * | 8/2005 | Meier et al. ............... 375/240.23 |
| 7,200,859 B1 * | 4/2007 | Perlman et al. ................ 725/133 |
| 2003/0123546 A1 | 7/2003 | Falik et al. |
| 2005/0089105 A1 | 4/2005 | Zhang et al. |
| 2005/0117640 A1 | 6/2005 | Han |
| 2006/0136457 A1 * | 6/2006 | Park et al. ..................... 707/101 |
| 2007/0121723 A1 * | 5/2007 | Mathew et al. .......... 375/240.12 |

* cited by examiner

SVC FILE DATA SHARING METHOD AND SVC FILE THEREOF

TECHNICAL FIELD

The present invention relates to a method of sharing data of a scalable video coding (SVC) file and the SVC file, and more particularly, to a method of sharing data of an SVC file by sharing metadata of tracks and using a base track reference and the SVC file thereof.

BACKGROUND ART

FIG. 1 illustrates a concept of scalable video coding (SVC).

Referring to FIG. 1, in SVC, a plurality of video layers are coded into a single bit string.

An SVC layer is constructed with a base layer and one or more enhancement layers stacked on the base layer.

Each enhancement layer can represent the maximum bit rate, frame rate, and resolution based on information about a lower layer.

In the SVC, as the number of sequentially stacked enhancement layers increases, various bit rates, frame rates, and resolutions can be supported.

The SVC is a coding technique capable of solving problems pertaining to a variety of bandwidths occurring in heterogeneous network environments, a variety of performances and resolutions of receiving terminals, a variety of preferences of content consumers, and the like.

FIG. 2 illustrates a format of a multimedia file.

In general, when a video content is desired to be stored as a file, metadata about a coding method, contents, and any access information for the content are separately stored so as to secure free access to any location of the content and to easily reprocess the content, in addition to media data of the content.

In addition, a unit of track is defined as a unit of a medium which is continuously reproducible.

Referring to FIG. 2, a multimedia file is stored as a structure having an audio track and a video track.

When the video content is coded into an SVC format, the multimedia file may have two or more video tracks, due to a feature of SVC.

FIG. 3 illustrates scalable layers of SVC coded content.

The SVC has a feature of coding a plurality of video layers into a single bit string.

Referring to FIG. 3, a scalable base bit-stream is a single bit-stream (p1 to pm) having the highest image quality. The scalable base bit-stream includes the total coded data 310.

A sub bit-stream (to-be-transmitted coded data a which ranges from 0 to a, or to-be-transmitted coded data b which ranges from 0 to b) can be freely generated according to a bandwidth supported by a network or a specification of a user terminal.

A sub bit-stream a 320 includes the to-be-transmitted coded data a. A sub bit-stream b 330 includes the to-be-transmitted coded data b.

A scalable base bit-stream, a sub bit-stream a and a sub bit-stream b are constructed with one or more scalable layers p1 to pi.

The scalable base bit-stream includes all the scalable layers p1 to pi.

The other sub bit-streams include scalable layers having a specific range (sub bit-stream a includes scalable layers p1 to pi, or sub bit-stream b includes scalable layers p1 to p3).

FIG. 4 illustrates a format of an SVC file in which SVC coded content is stored.

Referring to FIG. 4, the scalable base bit-stream and the sub bit-stream can be respectively constructed with separate tracks, which are generally referred to as a scalable base track and a sub track.

In this case, two or more video tracks may be included in a file. When two or more video tracks are included in a file, metadata for representing scalable layers may be separately included in the file according to the tracks.

Conventionally, when SVC coded content is stored in a file, ① data is repeated and duplicated in the common parts of the metadata of tracks, and ② a relation of the tracks correlated to one another cannot be represented.

DETAILED DESCRIPTION OF THE INVENTION

Technical Problem

The present invention provides a method of sharing data of a scalable video coding (SVC) file and the SVC file capable of reducing a storage capacity by avoiding duplication of common data and providing convenience when stored content is reprocessed by allowing a relation of tracks correlated to one another to be represented, when an SVC coded content is stored as a file.

Technical Solution

According to an aspect of the present invention, there is provided a method of sharing data of a scalable video coding (SVC) file having media data which includes at least one scalable layer in each frame, the method comprising: storing at least one scalable layer entry, in which metadata for the at least one scalable layer included in the media data is stored, in a scalable base track; storing identification information of the at least one scalable layer and identification information of scalable base tracks in a sub track generated based on the part of the at least one scalable layer included in the media data which is a basis of the scalable base track; and sharing the scalable layer entry stored in the scalable base track on the basis of the identification information of the scalable layers and the identification information of the scalable base track.

According to another aspect of the present invention, there is provided a method of sharing data of an SVC file having a plurality of media data including scalable base tracks having at least one scalable layer, the method comprising storing identification information of the scalable base track, which is a basis of generation of a sub track among the scalable base tracks, in at least one sub track generated based on one of the scalable base tracks.

According to another aspect of the present invention, there is provided an SVC file having media data including at least one scalable layer in each frame, the SVC file comprising: a scalable base track including at least one scalable layer entry each storing metadata of the at least one scalable layer; and at least one sub-track generated based on the scalable base track, which includes identification information of the scalable layer that is a basis of generation of a sub track among the scalable layers and identification information of the scalable base track, instead of the scalable layer entry.

According to another aspect of the present invention, there is provided an SVC file having a plurality of media data including scalable base tracks having at least one scalable layer, the SVC file comprising at least one sub track which is generated based on one of the plurality of scalable base tracks in which identification information of the scalable base track that is a basis of generation of a sub track among the plurality of scalable base tracks is stored.

Advantageous Effects

Accordingly, when scalable video coding (SVC) coded content is stored as a file, ①it is possible to avoid duplication of common data of scalable layers by sharing metadata of tracks. ② It is also possible to represent a relation of tracks correlated to one another by including a base track reference.

DESCRIPTION OF THE DRAWINGS

The above and other features and advantages of the present invention will become more apparent by describing in detail exemplary embodiments thereof with reference to the attached drawings in which.

BEST MODE

Hereinafter, exemplary embodiments of the present invention will be described in detail with reference to the attached drawings.

1. Sharing of Metadata According to Tracks

Figure 1:
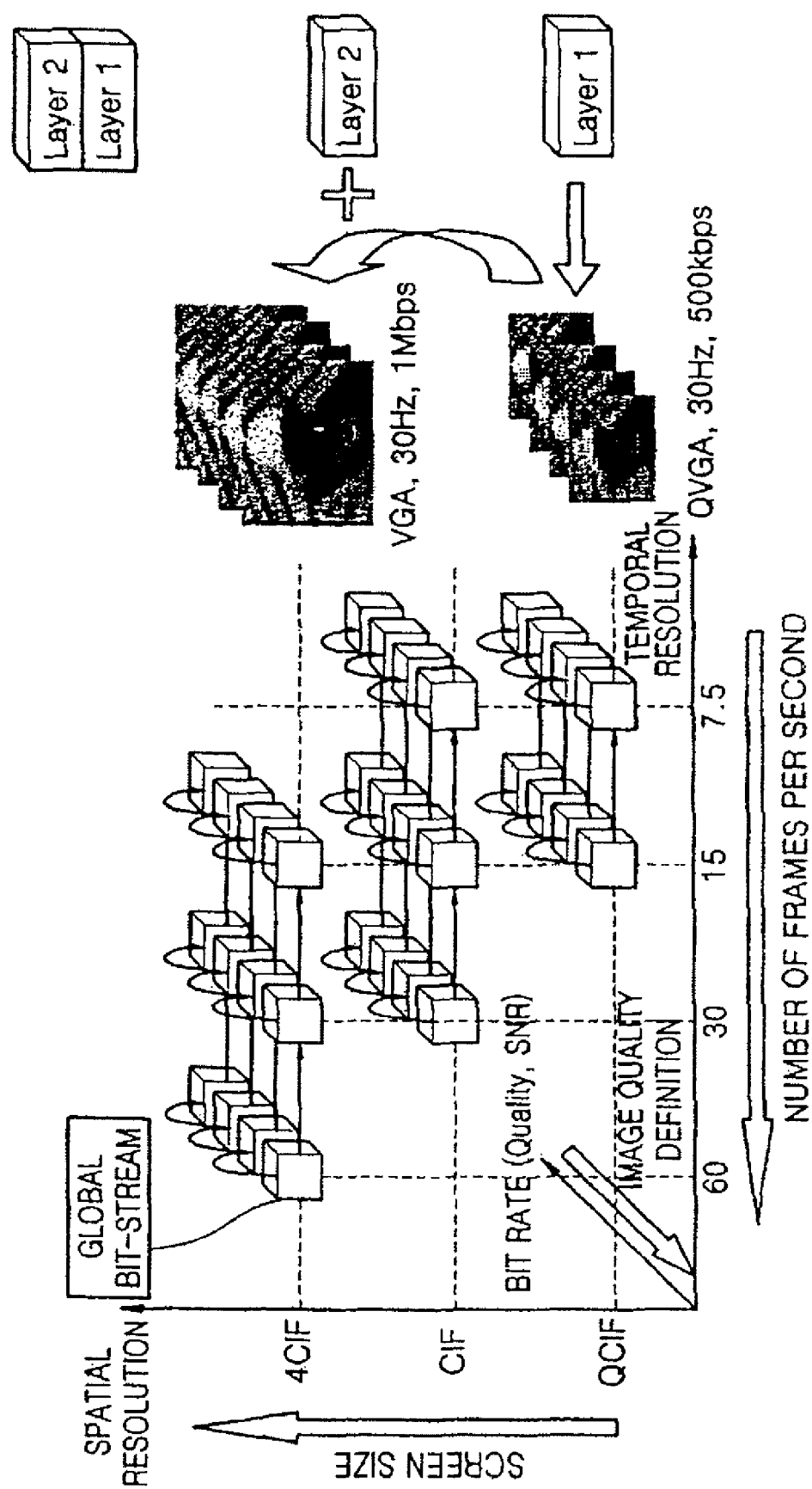
FIG. 1 illustrates a concept of scalable video coding (SVC)
Figure 2:
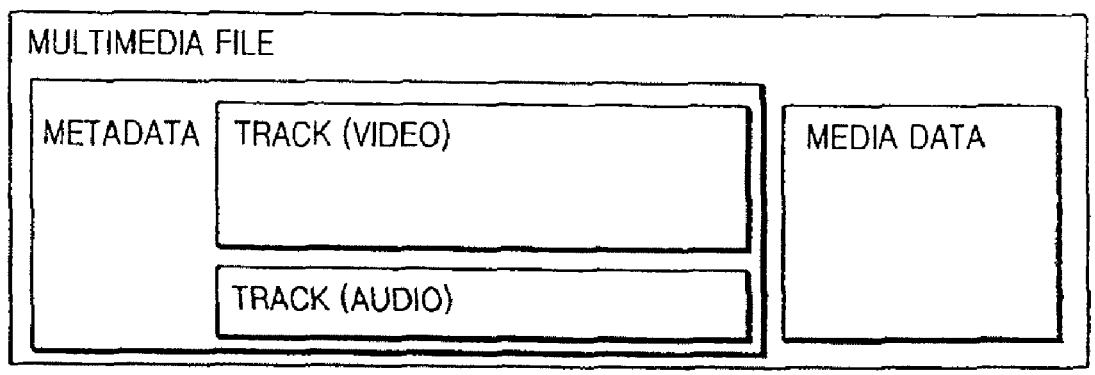
FIG. 2 illustrates a format of a multimedia file.
Figure 3:
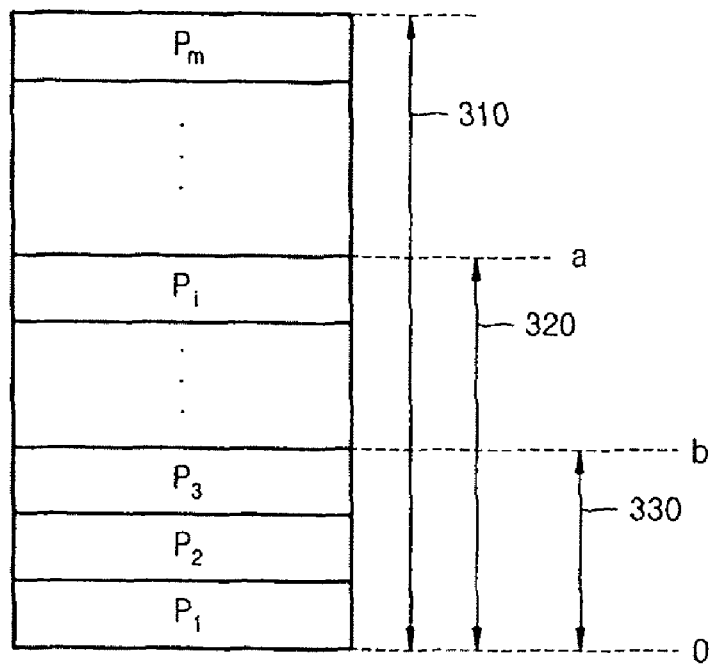
FIG. 3 illustrates scalable layers of SVC coded content.
Figure 4:
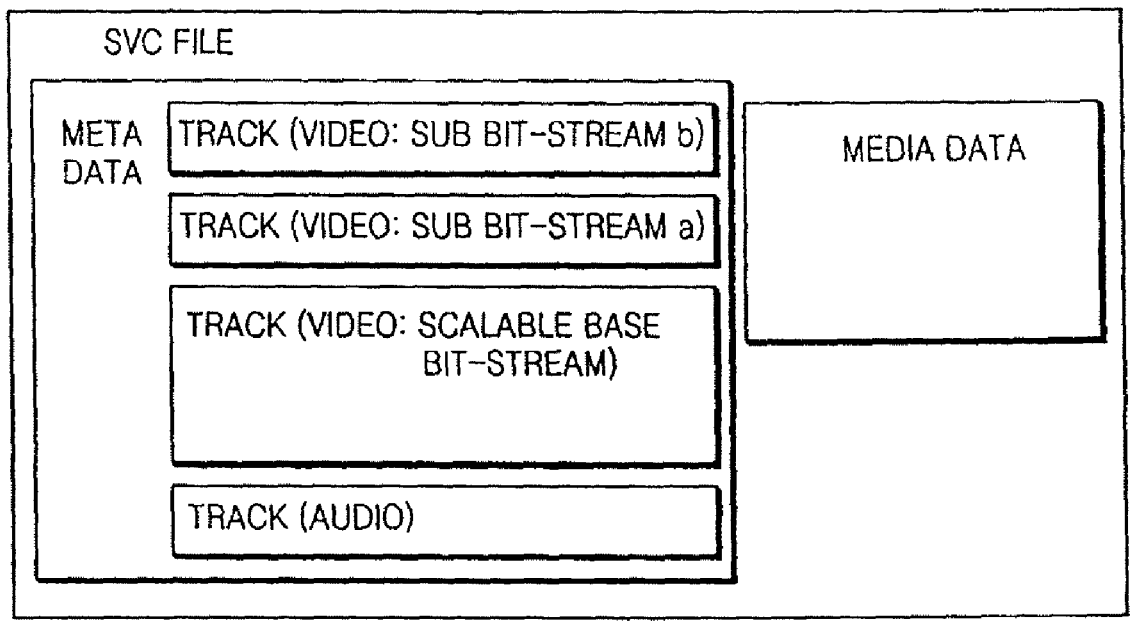
FIG. 4 illustrates a format of an SVC file in which SVC coded content is stored.
Figure 5:
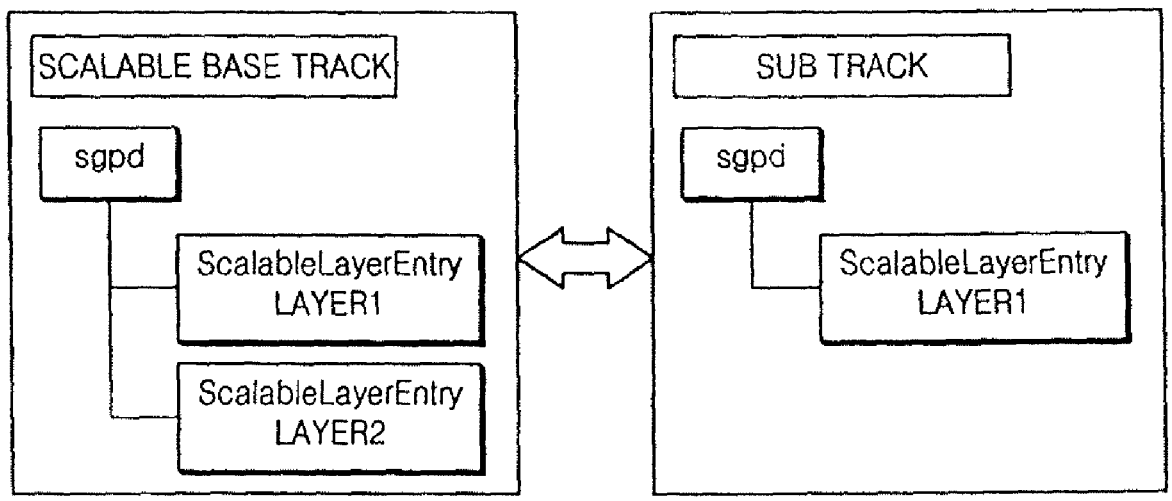
FIG. 5 illustrates scalable layer entries stored in each track of metadata of an SVC file.

FIG. 5 illustrates scalable layer entries stored in each track of metadata of a scalable video coding (SVC) file.

Referring to FIG. 5, a scalable base track and a sub track generated based on the scalable base track may have the same scalable layer entry ScalableLayerEntry of a layer 1.

When SVC coded content is stored as a file, metadata including additional information for each scalable layer is referred to as a scalable layer entry ScalableLayerEntry.

In the SVC file, a sample group description box (sgpd) of a track includes the scalable layer entry ScalableLayerEntry.

When different sub tracks are generated based on the scalable base track, the sub tracks include the common scalable layers.

The common scalable layers include the same metadata ScalableLayerEntry. Data is duplicated with respect to the common part of the metadata.

Figure 6A:
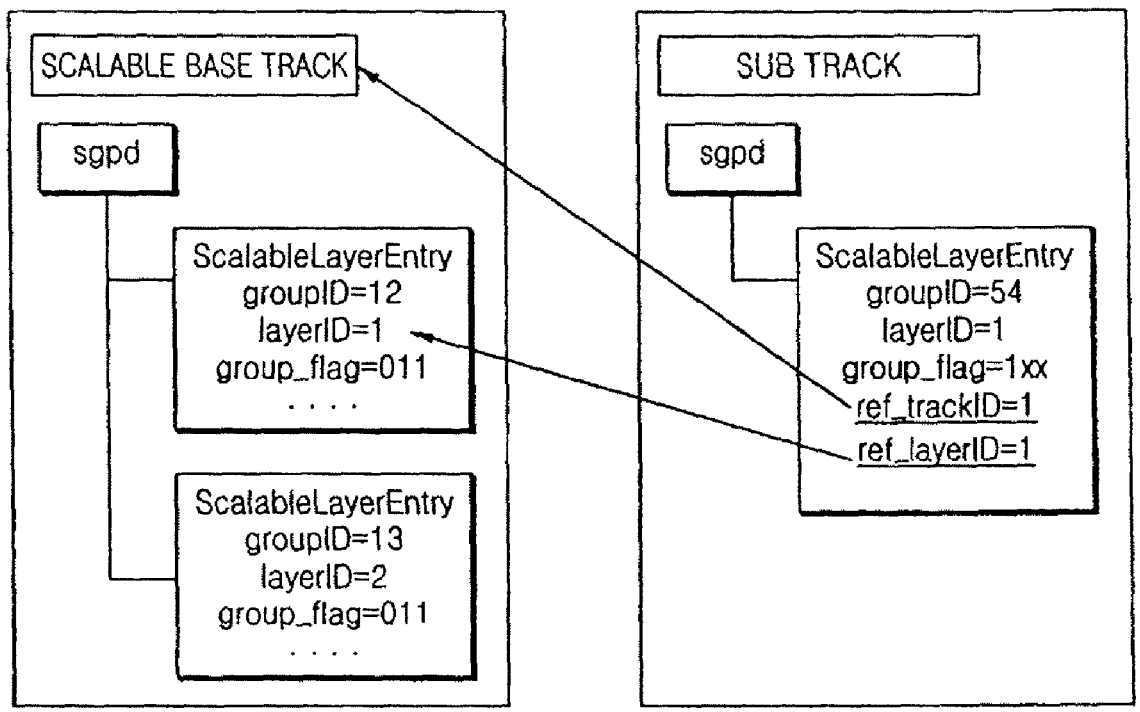
FIG. 6a illustrates an SVC file that shares a scalable layer entry among tracks according to an exemplary embodiment of the present invention.

FIG. 6a illustrates an SVC file that shares a scalable layer entry ScalableLayerEntry according to an exemplary embodiment of the present invention.

According to the current embodiment, identification information ref_track ID of the scalable base track for designating the scalable base track and identification information ref_layer ID of the scalable layer for designating the scalable layer are used instead of recording the same metadata ScalableLayerEntry for the common scalable layer on each track.

The scalable base track includes a scalable layer entry having metadata for the scalable layer.

The sub track generated based on the scalable base track includes identification information of the scalable layer and identification information of the scalable base track, which is the basis of the generation of the sub track among scalable layers, instead of the scalable layer entry.

In FIG. 6a, the sub track uses the identification information ref_track ID=1 of the scalable base track for designating the scalable base track and the identification information ref_layer ID=1 of the scalable layer for designating the scalable layer without repeatedly storing the scalable layer entry ScalableLayerEntry.

The identification information of the scalable layer that is the basis of generation of the sub track and the identification information of the scalable base track can be represented in the sgpd track.

Syntax for sharing the value of the scalable layer entry ScalableLayerEntry of the scalable base track using identification information ref_track ID of the scalable base track and the identification information of the scalable layer is described here below.

```
class ScalableLayerEntry( ) extends VisualSampleGroupEntry
('scif') {
    unsigned int(8) groupId;
    unsigned int(8) layerId;
    unsigned int(8) group_flags;
    unsigned int(8) reserved = 0;
    if((group_flag = 04) (= 04){
        if ((group_flags = 01) == 01) // primary definition
        of layer
        {
            SVCDependencyDescriptionEntryBox( ); //
            Mandatory Box
            //Optional Boxes of fields may follow when
            defined later
            RectRegionBox( );                    // optional
            BufferingBox( );                     // optional
            LayerDependencyBox( );               // optional
            ScalabilityInformationSEIBox( ); // optional
        }
        if ((group_flags = 02) == 02)
        {
            unsigned int(8) entry_count
            for (j=0; j < entry_count; j++)
                signed int(16) delta_layer_Id)
        }
    }
    else
    {
        unsigned int(32) ref_trackId;
        unsigned int(8) ref_layerId;
        // followings are only used to override existing descriptor
        or add new one
        if ((group_flags = 01) ==01) // primary definition
        of layer
        {
            //Optional Boxes or fields may follow when
            defined later
            RectRegionBox( );                    // optional
            BufferingBox( );                     // optional
            LayerDependencyBox( );               // optional
            ScalabilityInformationSEIBox( ); // optional
        }
        if ((group_flags = 02) == 02)
        {
            unsigned int(8) entry_count
```

-continued

```
        for (j=0; j < entry_count; j++)
            signed int(16) delta_layer_id)
        }
    }
}
```

According to an embodiment of the present invention, it is unnecessary to repeatedly store the same contents of the original metadata by including the identification information ref_track ID of the scalable base track and the identification information ref_layer ID of the scalable layer and allowing all the metadata to refer to the original metadata.

Figure 6B:
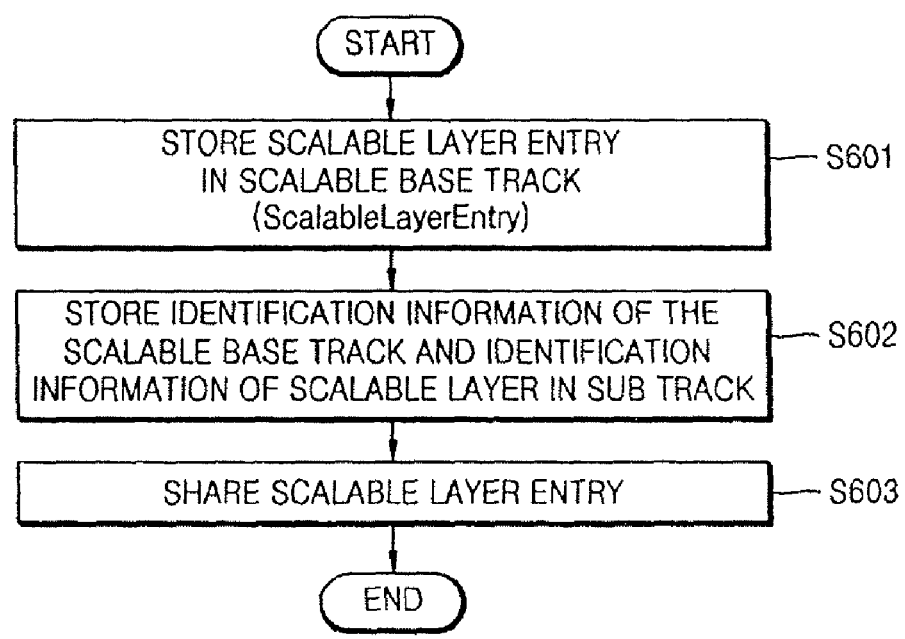
FIG. 6b illustrates a flowchart of a method of sharing a scalable layer entry among tracks of metadata of an SVC file according to an exemplary embodiment of the present invention.

FIG. 6b illustrates a flowchart of a method of sharing a scalable layer entry ScalableLayerEntry among tracks of metadata of an SVC file according to an exemplary embodiment of the present invention.

First, a scalable layer entry ScalableLayerEntry, which stores the metadata for the scalable layer included in the media data of the SVC file, is stored in the scalable base track (operation S601).

The identification information of the scalable layer and the identification information of the scalable base track which is the basis of generation of the sub track are stored in the sub track generated based on the scalable base track (operation S602).

The scalable layer entry is shared based on the identification information of the scalable layer and the identification information of the scalable base track, which is the basis of generation of the sub track and stored in the sub track, with the scalable base track (operation S603).

The identification information of the scalable layer and the identification information of the scalable base track, which is the basis of generation of the sub track, can be represented in the sgpd track of the scalable sub track.

In the present invention, it is possible to avoid repeating the common data according to scalable layers by sharing metadata for tracks. Hereinafter, the base track reference for representing a relation among the correlated tracks according to an embodiment of the present invention will be described.

2. Base Track Reference

Figure 7A:
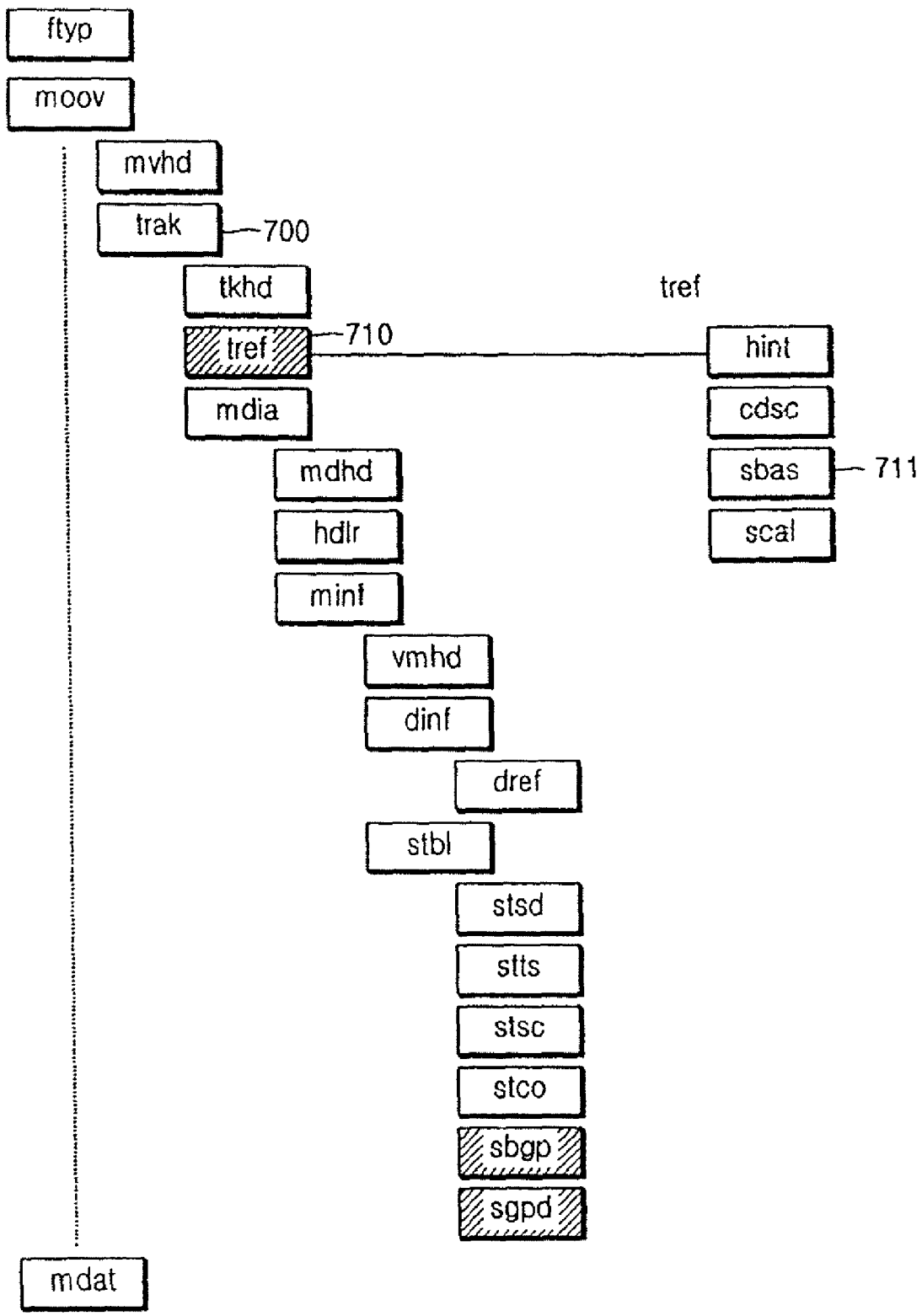
FIG. 7a illustrates an SVC file including identification information of a scalable base track according to an exemplary embodiment of the present invention.

FIG. 7a illustrates an SVC file including identification information of a scalable base track according to an exemplary embodiment of the present invention.

According to the embodiment, it is possible to indicate the corresponding track, from which each sub track is derived, in the sub track.

It is possible to provide a convenience when the stored content is reprocessed by allowing the relation of the tracks correlated to one another to be represented.

Referring to FIG. 7a, metadata trak 700 for representing a track includes lower level metadata that is a track reference tref 710.

Syntax of the track reference tref 710 is described here below.

```
aligned(8) class TrackReferenceBox extends Box('tref') {
}
aligned(8) class TrackReferenceTypeBox (unsigned int(32)
reference_type) extends
Box(reference_type) {
    unsigned int(32) track_IDs[ ];
}
```

The track reference tref 710 may include a plurality of track-IDs depending on types.

It is possible to indicate the corresponding track, from which each sub track is derived, in the sub track by storing a type of the track ID of the scalable base track, which is referred to as sbas 711, in the track reference tref 710.

Similar to the type sbas 711 according to the current embodiment, types hint, cdsc, and scal also indicate functions of the tracks and refer to tracks in which the tracks are used.

According to the current embodiment, when the tracks having the same presentation are constructed with a scalable base track and a plurality of sub tracks derived from the scalable base track, a reference sbas 711, through which the scalable base track can be found, and a relation of sub tracks can be represented in the sub tracks.

Figure 7B:
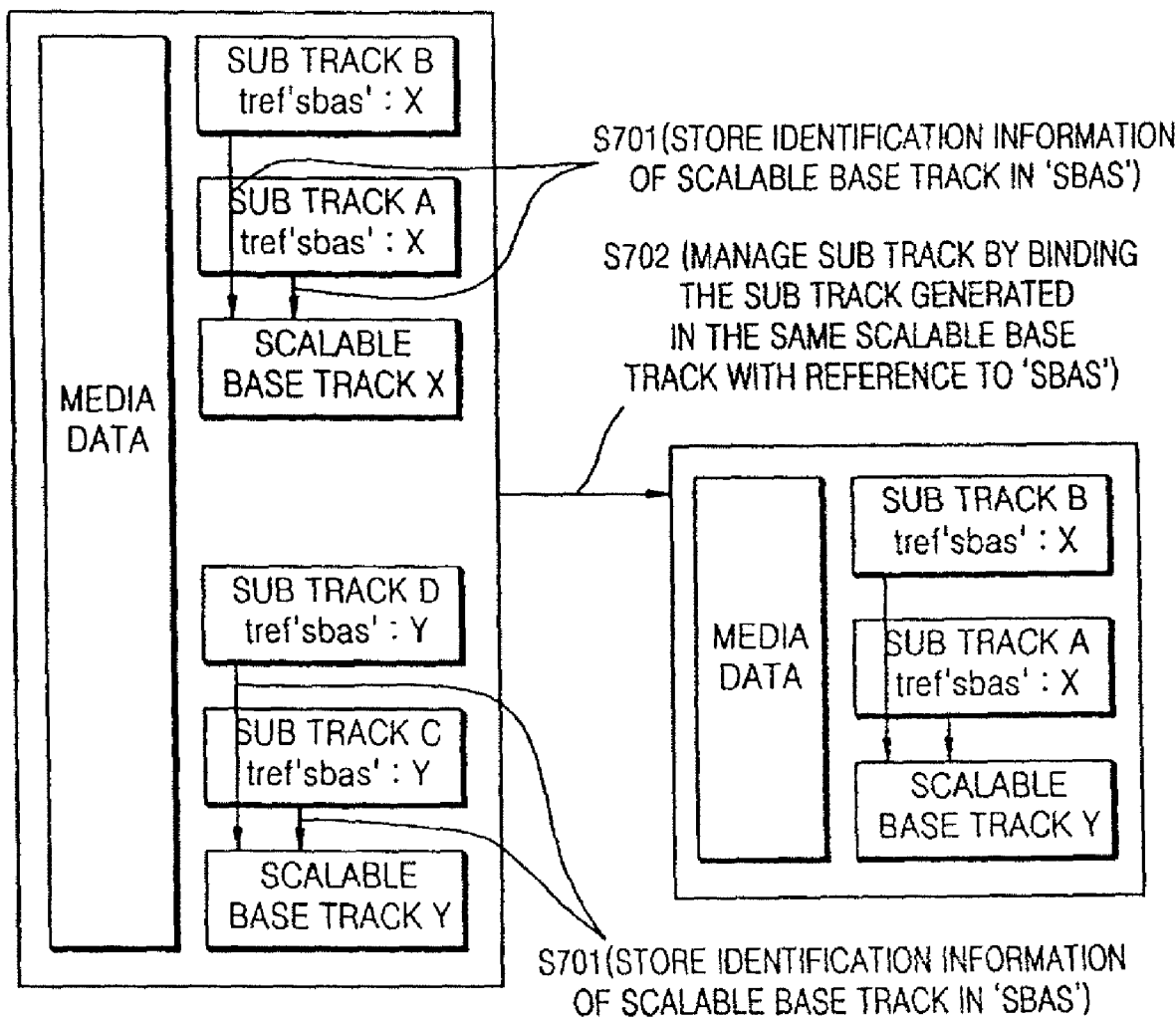
FIG. 7b illustrates a method of managing sub-tracks by binding sub-tracks which have the same scalable base track according to an exemplary embodiment of the present invention.

FIG. 7b illustrates a method of managing sub tracks by binding sub tracks which have the same scalable base track according to an exemplary embodiment of the present invention.

When content is stored as a file, two or more presentations can be stored in a file.

In this case, when the content is SVC coded content, the scalable base track and one or more sub tracks derived from the scalable base track separately from the scalable base track may be included in each presentation.

In this case, the sub track may have to determine the scalable base track from which the sub track is derived.

It is possible to manage the sub tracks by binding sub tracks which have the same scalable base track by indicating the corresponding scalable base track, from which each sub track is derived, in the sub track and storing the track ID of the scalable base track in the type sbas 711.

Referring to FIG. 7b, sub tracks A and B are generated based on a scalable base track X.

The scalable base track, from which the sub tracks A and B are derived, is indicated by storing the scalable base track X in the sbas track of the track reference tref of the sub tracks A and B (operation S701).

Sub tracks C and D are generated based on a scalable base track Y.

The scalable base track, from which the sub tracks C and D are derived, is indicated by storing the scalable base track Y in the sbas track of the track reference tref of the sub tracks C and D (operation S702).

According to the current embodiment, it is possible to manage the sub tracks by binding sub tracks generated based on the same scalable base track on the basis of the identification information of the scalable base track.

For example, there may be a case where it is desired that all the tracks generated based on the scalable base track Y be deleted.

In this case, according to the current embodiment, it is possible to easily manage all the sub tracks generated from the scalable base track Y by deleting all the tracks having the track ID of the scalable base track Y in the sbas track with reference to the sbas track of the track reference tref.

In the present invention, a waste of storage space for the duplicated metadata ScalableLayerEntry is prevented by sharing the metadata ScalableLayerEntry for representing the scalable layer of the sub track by using only the identification information ref_track ID of the scalable base track and the identification information ref_layer ID of the scalable layer In addition, convenience is provided when the stored content is reprocessed by allowing the relation of the correlated tracks to be represented by including the base track reference, which is sbas, in the sub track.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

As described above, when scalable video coding (SVC) coded content is stored as a file, it is possible to reduce storage capacity by avoiding duplication of common data and to provide convenience when the stored content is reprocessed by allowing a relation of tracks correlated to one another to be represented.

The invention claimed is:

1. A method of sharing data of an SVC (scalable video coding) file having media data which includes at least one scalable layer in each frame, the method comprising:
    storing at least one scalable layer entry, in which metadata for the at least one scalable layer included in the media data is stored, in a scalable base track;
    storing identification information of the at least one scalable layer and identification information of scalable base tracks in a sub track generated based on the part of the scalable layers included in the media data which is a basis of the scalable base track; and
    sharing the scalable layer entry stored in the scalable base track on the basis of the identification information of the scalable layers and the identification information of the scalable base track.

2. The method of claim 1, wherein the identification information of the part of the scalable layers and the identification information of the scalable base track is represented in an sgpd track of the scalable sub track.

3. A method of sharing data of an SVC file having a plurality of media data which includes scalable base tracks having at least one scalable layer, the method comprising storing identification information of the scalable base track that is a basis of generation of a sub track among the scalable base tracks in at least one sub track generated based on one of the scalable base tracks; and storing identification information of the at least one scalable layer in the at least one sub track.

4. The method of claim 3, further comprising managing the at least one sub track by binding sub tracks which are generated based on the same scalable base track on the basis of the identification information of the scalable base track.

5. The method of claim 3 or 4, wherein the identification information of the
    scalable base track is represented in an sbas track of a track reference type box including track reference information of the at least one sub track.

6. A computer-readable recording medium having embodied thereon a computer program for executing the method of any one of claims 1 to 4.

7. A computer-readable recording medium having embodied thereon a computer program for executing the method of claims 5.

8. An SVC file stored in memory having media data which includes at least one scalable layer in each frame, the SVC file comprising:
    a scalable base track including at least one scalable layer entry each storing metadata of the at least one scalable layer; and
    at least one sub track generated based on the scalable base track, which includes identification information of the scalable layer that is a basis of generation of the at least one sub track among the scalable layers and identification information of the scalable base track.

9. The SVC file of claim 8, wherein the identification information of the scalable layer which is the basis of generation of the sub track among the scalable layers and the identification information of the scalable base track is represented in an sgpd (sample group description box) track of the sub track.

10. An SVC file having a plurality of media data which includes scalable base tracks having at least one scalable layer, the SVC file comprising at least one sub track which is generated based on one of the plurality of scalable base tracks in which identification information of the at least one scalable layer and identification information of the scalable base track that is a basis of generation of a sub track among the plurality of scalable base tracks is stored.

11. The SVC file of claim 10, wherein the identification information of the scalable base track is represented in an sbas track of a track reference type box including track reference information of the sub track.

* * * * *